United States Patent

Katz et al.

Patent Number: 5,538,104
Date of Patent: Jul. 23, 1996

[54] BRAKE PAD

[75] Inventors: Matthias Katz, Neckarsulm; Friedrich Beck, Öhringen-Verrenberg; Hans-Herbert Noack, Zweiflingen, all of Germany

[73] Assignee: Eagle-Picher Industries GmbH, Germany

[21] Appl. No.: 575,587

[22] Filed: Dec. 20, 1995

Related U.S. Application Data

[63] Continuation of Ser. No. 280,728, Jul. 26, 1994, abandoned.

[30] Foreign Application Priority Data

Jul. 26, 1993 [DE] Germany .......... 43 25 066.1

[51] Int. Cl.⁶ .......... F16D 55/00; F16D 65/08; F16D 65/02; F16D 65/092
[52] U.S. Cl. .......... 188/73.1; 188/73.37; 188/250 E; 188/250 B; 188/264 G; 188/250 G
[58] Field of Search .......... 188/73.1, 73.2, 188/264 G, 250 E, 250 G, 250 B, 250 A, 73.37, 218 A; 192/109 B

[56] References Cited

U.S. PATENT DOCUMENTS

| | | | |
|---|---|---|---|
| 3,477,551 | 11/1969 | Beuchle et al. | 188/250 B |
| 3,490,563 | 1/1970 | Hahm | 188/73.37 |
| 3,966,026 | 6/1976 | Filderman | 188/73.37 |
| 4,093,045 | 6/1978 | Kawamura | 188/73.37 |
| 4,155,430 | 5/1979 | Kawamura | 188/73.37 |
| 4,240,530 | 12/1980 | Tellenburg | 188/264 G |
| 4,603,760 | 8/1986 | Myers | 188/264 G |
| 4,846,312 | 7/1989 | Sweetmore et al. | 188/250 G |
| 5,289,904 | 3/1994 | Harrison | 188/73.1 |
| 5,320,200 | 6/1994 | Hashimoto | 188/250 E |

FOREIGN PATENT DOCUMENTS

| | | | |
|---|---|---|---|
| 0282129 | 9/1988 | European Pat. Off. | |
| 8527259 | 3/1987 | Germany . | |
| 3842428 | 6/1990 | Germany . | |
| 4104812 | 8/1992 | Germany . | |
| 0207535 | 12/1983 | Japan | 188/73.37 |
| 9214965 | 9/1992 | WIPO | 188/250 B |

OTHER PUBLICATIONS

VDI/VDE–Handbuch Feinwerktechnik, Feinwerkelemente Stauch– und Biegeverbindungen, VDI/VDE 2251, Blatt 2, pp. 16–21, Jan. 1979.

Primary Examiner—Douglas C. Butler
Attorney, Agent, or Firm—Bell, Seltzer, Park & Gibson

[57] ABSTRACT

A brake pad assembly comprises a backplate, a friction lining secured to one side of the backplate and a planar dampening sheet secured to the other side of the backplate. The dampening sheet has at least one embossed projection extending from the one side thereof and the backplate has at least one recess in the side thereof secured to the dampening sheet and which is of generally the same configuration as the projection in the dampening sheet to receive the projection. The projection is partially outlined by at least one cut in the dampening sheet forming a cut edge on the projection which extends outside the plane of the dampening sheet to abut against the wall of the recess and compensate for excessive shearing forces caused between the dampening sheet and the backplate during a braking operation utilizing the brake pad assembly.

14 Claims, 2 Drawing Sheets

BRAKE PAD

This application is a continuation of application Ser. No. 08/280,728, filed Jul. 26, 1994, now abandoned.

FIELD OF THE INVENTION

This invention relates to a brake pad assembly of the type having a backplate with a friction lining secured to one side thereof and a dampening sheet secured to the other side thereof.

BACKGROUND OF THE INVENTION

With brake pad assemblies of the type comprising a backplate with a friction lining at one side thereof and a dampening sheet at the other side thereof, the dampening sheet has the purpose of dampening unwanted vibrations, i.e. squealing noise, of the backplate during braking. In order to accomplish this purpose, the dampening sheet must be in contact with the backplate. With the usual design of disk brake assemblies, the braking force by which the backplate is pressed against the brake disk must be transmitted to the backplate via the dampening sheet. When braking occurs, the rotating brake disk seeks to take along with it the friction lining and the backplate, while the dampening sheet is held back by the element which applies the braking force to the brake pad. This creates very high shearing forces between the backplate and the dampening sheet.

While conventional connections between the backplate and the dampening sheet usually constitute bonding, additional measures need to be utilized to deal with the shearing forces taking into account that these additional measures must not deteriorate the ability of the dampening sheet to dampen the vibrations.

In previous brake pad assemblies, such as shown in Published European Patent Application EP 0 282 129, additional measures are provided to deal with such shearing forces between the backplate and the dampening sheet through projections of the dampening sheet in the form of knob-shaped or cup-like protuberances of the dampening sheet which are continuous and uninterrupted. The conical wall of the protuberance engages the limiting edge of a recess formed in the backplate. This arrangement causes considerable wear and, at the same time does not provide sufficient resistance against relative rotation between the dampening sheet and the backplate caused by shearing forces in the braking operation because of the conical shape of the protuberance.

In another prior brake pad assembly, as disclosed in German Patent 41 04 812, a dampening sheet is utilized with a recess that is coincident with a fastening recess formed in the backplate. A flange protrudes from the edge of the recess and is produced by lateral folding or beading of the dampening sheet. The flange may also consist of individual tongues. This arrangement again offers very little torsional resistance because the shearing forces, at least in part, always run in a direction in which they attempt to bend back the flange and in which the flange is not particularly strong.

OBJECTS AND SUMMARY OF THE INVENTION

Accordingly, it is the object of this invention to provide a brake pad assembly of the type utilizing a backplate, a friction lining secured to one side of the backplate and a planar dampening sheet secured to the other side of the backplate and wherein means are provided for satisfactorily resisting shearing forces created between the backplate and the dampening sheet during a braking operation utilizing the brake pad assembly.

By this invention, it has been found that this object may be accomplished by providing brake pad assembly of the type comprising a backplate, a friction lining secured to one side of the backplate and a planar dampening sheet secured at one side to the other side of the backplate. An improved dampening sheet in accordance with this invention has at least one embossed projection extending from the one side thereof and the backplate has at least one recess in the side thereof secured to the dampening sheet which is of generally the same configuration as the projection in the dampening sheet to receive such projection. The dampening sheet projection is partially outlined by at least one cut in the dampening sheet forming a cut edge on the projection which extends outside the plane of the dampening sheet to abut against a wall of the recess to provide desired resistance against shearing forces created between the backplate and the dampening sheet during a braking operation utilizing the brake pad assembly.

In one preferred form, the dampening sheet projection is generally arch-shaped and is partially outlined by two cuts in the dampening sheet forming two cut edges on the projection which extend outside the plane of the dampening sheet and both of which are adapted to abut against a wall of the recess in the backplate. In another preferred form, the dampening sheet projection is generally dome-shaped and is partially outlined by a single cut in the dampening sheet forming a single cut edge on the projection which extends outside the plane of the dampening sheet to abut against a wall of the backplate recess.

Preferably, the cut edge in either preferred form of the dampening sheet projection is rectilinear and the cut edges in the arch-shaped projection are parallel with each other. Preferably, there are at least two embossed projections in the dampening sheet and two recesses in the backplate for respectively receiving such projections and the projections and cut edges thereon are positioned generally perpendicularly to each other.

In another preferred embodiment of this invention, each recess in the backplate comprises an aperture extending through the backplate, a protuberance of the friction lining extending into the aperture to the other side of the backplate and defining a recess therein facing the dampening sheet for receiving the dampening sheet projection.

In the case of the brake pad assembly according to the invention and the improved dampening sheet according to the invention, the arched or domed protuberance which serves for resisting shearing forces has one or two cut edges which follow the course of the protuberance outside of the plane of the dampening sheet, while the respective other cut edge of each cut essentially remains in the plane of the dampening sheet. Thus, the one cut edge or two cut edges defining the projection are freely exposed so that they can enter into engagement with the sidewall of the associated recess formed in the backplate in order to cooperate in the transmission of shear between the dampening sheet and the backplate. Great forces can be transmitted since the forces are introduced into the dampening sheet substantially in the plane of the bulged dampening sheet. With both forms of projections, the arcuate embossment is very strong inherently due to its configuration and, therefore, will not become deformed by the shearing forces which are generated in operation. On the whole, very great torsional resistance thus is obtained. And yet the improved dampening sheet is easy to realize in manufacture. The embossed projection, for example, can be made during the stamping of the dampening sheet, such as by using a cut/stretch punch in the cutting tool.

In the case of the form of projection having but one cut, the arcuate embossment is of shell shape. That provides it with particularly great inherent strength. In the form of projection formed with two cuts, the configuration of the embossment is that of an arched web. That has the advantage of permitting very great shear forces to be transmitted not only in one direction but also in the opposite direction. The width of the web will be selected in accordance with the magnitude of the shearing forces which are expected.

Obviously, the embodiments according to the invention affords optimum torsional resistance when the projections have their cutting edges aligned in such a way that they extend approximately transversely of the respective direction in which the main shear force occurs at the place of the embossment. Yet the range of tolerance is wide as regards the orientation of the projections because, of course, they can transmit shearing forces in other directions as well, although of lesser magnitude. If the dampening sheet contains a plurality of projections, for example two, as will be the rule, it is best to orient them approximately at right angles in respect of their cutting edges. In that event they will supplement each other in effect to accommodate shear in different directions.

To obtain optimum transmission of forces between the projections and the recess in the backplate, the recess should have the same contour in the zone of its cutting edge(s) as the embossment. The simplest contour results with a rectilinear cutting edge or rectilinear cutting edges of the projections. Yet this need not absolutely be the choice. In principle, the cutting edge(s) may have other shapes, such as being wavy or curved. In the case of the embodiment with two cutting edges for each projection, these cutting edges preferably are parallel to each other. If they are rectilinear at the same time, the preferred embodiment is obtained, namely that of a web-like projection which cooperates with a rectangular recess in the backplate.

The noise insulation aimed at by the dampening sheet may be based on an insulation of vibrations. In that event the type of fastening selected for the dampening sheet at the backplate will be "floating", i.e. each projection will be fitted with tolerance in its fastening recess to permit limited clearance of motion of the dampening sheet. Alternatively, the projection may be fitted tightly in the recess, whereby the mass is increased.

The backplate may be provided with specific fastening recesses to receive the projections of the dampening sheet. No particular projections are required if the backplate includes at least one anchoring aperture for the friction lining which aperture is filled with the material of the friction lining and if the recess which serves to receive a projection of the dampening sheet is formed at least partly in the friction lining material which is located in the anchoring aperture. In the case of a preferred modification of this solution, especially in conjunction with a web-shaped projection, the recess, for instance, of groove shape formed in the friction lining material is continued a little at both ends in the actual backplate so that the embossment will cooperate both with the material of the friction lining and with the backplate proper.

BRIEF DESCRIPTION OF THE DRAWINGS

Some of the objects and advantages of this invention have been stated above, other objects and advantages will appear as this description continues when taken in conjunction with the accompanying drawings, in which.

DETAILED DESCRIPTION OF PREFERRED EMBODIMENTS OF THE INVENTION

Figure 1:
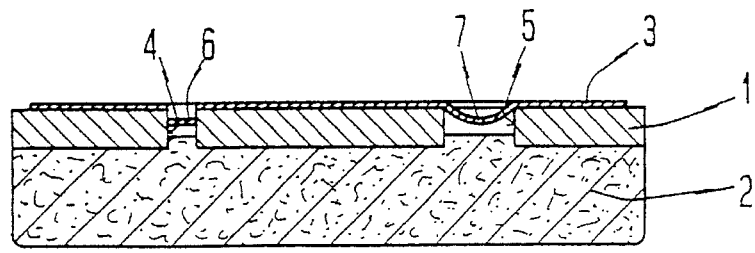
FIG. 1 is a sectional view through a brake pad assembly constructed in accordance with this invention and taken generally along the line 1—1 of FIG. 2.

The brake pad assembly illustrated in FIG. 1 comprises a backplate 1 which carries a friction lining 2 at one side. At the other side a dampening sheet 3 is provided which is joined to the backplate by bonding throughout the surface area. The backplate 1 has two apertures or recesses 4 and 5 which serve to anchor the friction lining 2 in that the material of the friction lining is pressed into these apertures which, at the same time, serve for securing the dampening sheet 3 to the backplate 1 in such manner that the backplate and the dampening sheet cannot rotate with respect to each other when braking operations generate shearing forces.

Figure 2:
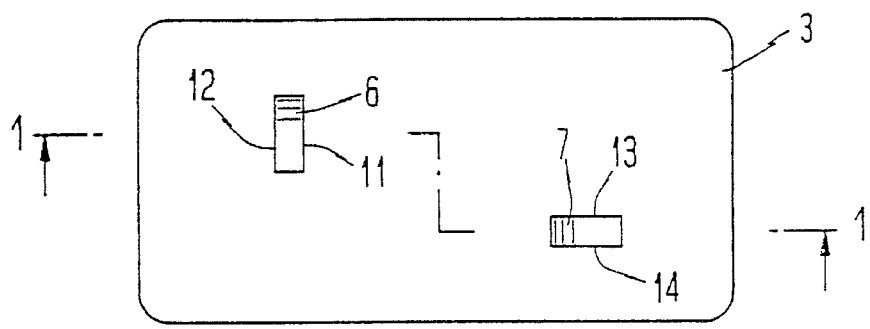
FIG. 2 is a top plan view of the brake pad assembly shown in FIG. 1.
Figure 3:
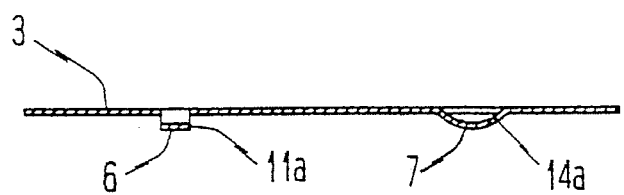
FIG. 3 is a front elevation view of the dampening sheet utilized in the brake pad assembly of FIGS. 1 and 2.

To that end the dampening sheet 3 is formed with two projections protruding out of the plane of the dampening sheet, as shown in FIGS. 2 and 3. These projections are embodied by arched, web-like projections 6 and 7 arranged in such a way on the dampening sheet as to cooperate with and engage in the recesses 4 and 5.

The projection 6 is totally surrounded by the dampening sheet proper in which it is defined by two parallel, rectilinear cuts 11 and 12. One cut edge each, see cut edge 11a in FIG. 3, follows the convexity of the projection and, therefore, extends outside of the plane of the dampening sheet, while the respective other cut edge of each cut 11 and 12 lies in the plane of the dampening sheet. As a result, the projection has the shape of a web of rectangular configuration which is raised above the dampening sheet.

The projection 7 is of similar shape as projection 6, but its cuts 13 and 14 and the respective cut edges in the dampening sheet extend transversely of the direction of the cuts 11 and 12 of the first projection 6.

Both recesses 4 and 5 in the backplate have a rectangular outline corresponding to the rectangular outline of the corresponding projection. The dimensions are selected so as to leave minor mutual clearance of motion.

Figure 4:
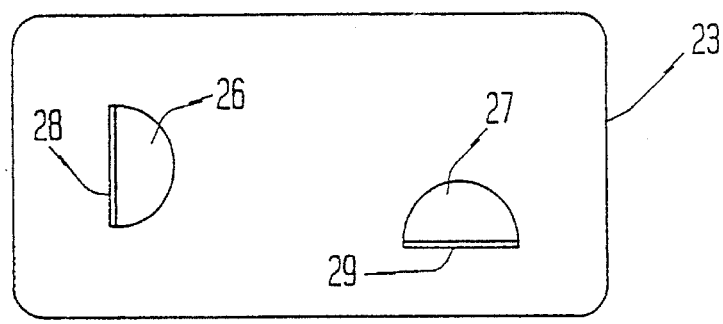
FIG. 4 is a top plan view of another preferred embodiment of a dampening sheet in accordance with this invention.

FIG. 4 shows a different dampening sheet 23 which is formed with two shell-like projection 26 and 27, each being defined by one straight cut 28 and 29, respectively, in the dampening sheet. Again, the one cut edge of both cuts 28, 29 follows the curvature of the embossment, while the respective other cut edge of the cut continues to lie in the plane of the dampening sheet.

Figure 5:
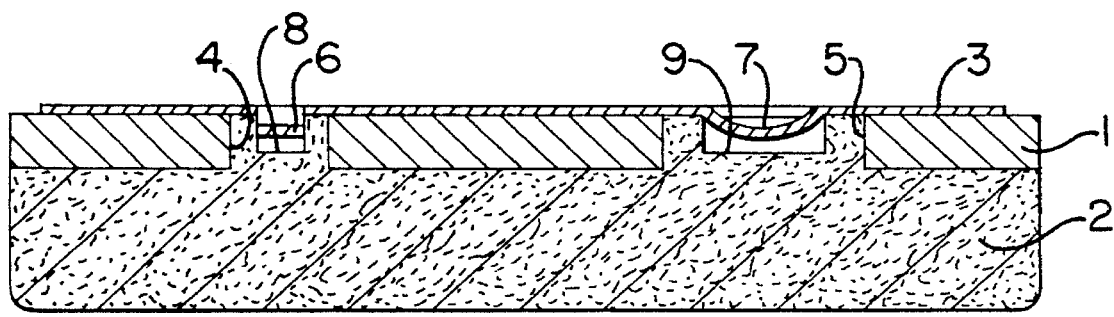
FIG. 5 is a sectional view, like FIG. 1, of another preferred embodiment of brake pad assembly according to this invention.
Figure 6:
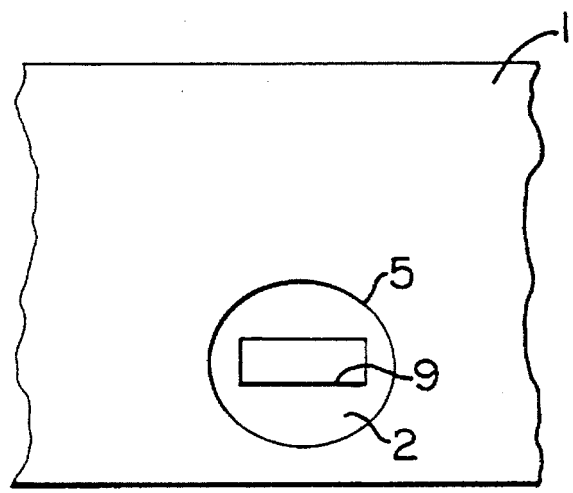
FIG. 6 is a partial top plan view of the backplate with the dampening sheet removed of the brake pad assembly of FIG. 5.

Referring now to the embodiment illustrated in FIGS. 5 and 6, the apertures 4 and 5 are larger than in FIG. 1 and filled with the material of the friction lining 2 up to the surface of the backplate 1 which is in contact with the dampening sheet 3. Two recesses 8 and 9, to receive the projections 6 and 7, respectively, are formed in the material of the friction lining 2. As in the case of FIG. 1 the recesses receiving the projections have the same general configuration as the corresponding projection. With the embodiment according to FIG. 5 the cut edge of the projections do not abut the backplate itself, but abut the material of the friction line filling out the apertures 4 and 5, respectively.

Thus, this invention has provided a brake pad assembly which overcomes previous problems presented in prior brake pad assemblies and provides means which compensate for the shearing forces created during a braking operation between the dampening sheet and the backplate of the type of brake pad assembly described with respect to this invention.

What is claimed is:

1. A brake pad assembly comprising a backplate, a friction lining secured to one side of said backplate and a planar dampening sheet secured at one side to the other side of said backplate, said dampening sheet having at least one embossed projection extending from the one side thereof for transmitting shear forces, and being totally surrounded by the dampening sheet, said backplate having at least one recess in the side thereof secured to said dampening sheet and being of the same general configuration as said projection in said dampening sheet to receive said projection, said projection being partially outlined by at least one cut in said dampening sheet forming an embossed cut edge on said projection which embossed cut edge starts from the plane of the dampening sheet, extends without interruption outside the plane of said dampening sheet and returns back to said plane, while the opposite cut edge remains in said plane, said recess having a wall extending parallel to and abutting against the embossed cut edge, whereby shear forces are transmitted between said backplate and said dampening sheet perpendicularly into the embossed cut edge and the parallel side wall.

2. A brake pad assembly, as set forth in claim 1, in which said projection is generally arch-shaped and is partially outlined by two said cuts in said dampening sheet forming two said cut edges on said projection which extend outside the plane of said dampening sheet.

3. A brake pad assembly, as set forth in claim 1, in which said projection is generally dome-shaped and is partially outlined by a single said cut in said dampening sheet forming a single said cut edge on said projection which extends outside the plane of said dampening sheet.

4. A brake pad assembly, as set forth in claim 1, in which said cut edge abuts against a wall of said recess.

5. A brake pad assembly, as set forth in claims 1, 2, 3 or 4, in which each said cut edge on said projection is rectilinear.

6. A brake pad assembly, as set forth in claim 2, in which said two cuts in said dampening sheet and said two cut edges on said projection are parallel with each other.

7. A brake pad assembly, as set forth in claims 1, 2, 3 or 4, comprising at least two embossed projections in said dampening sheet and two recesses in said backplate for respectively receiving said projections, and wherein said projections and said cut edges on said projections are positioned generally perpendicularly to each other.

8. A brake pad assembly, as set forth in claim 1, 2, or 3, in which said at least one recess in said backplate comprises an aperture extending through said backplate, and a protuberance of said friction lining extending into said aperture to said other side of said backplate and defining a recess therein facing said dampening sheet for receiving said dampening sheet projection.

9. A dampening sheet adapted to form a part of a brake pad assembly and having at least one embossed projection extending from one side thereof for transmitting shear forces and being totally surrounded by the dampening sheet and adapted to be received by a recess in one side of a backplate of the brake pad assembly, said projection being partially outlined by at least one cut in said dampening sheet forming an embossed cut edge on said projection, which embossed cut edge starts from the plane of the dampening sheet, extends without interruption outside the plane of said dampening sheet and returns back to said plane, while the opposite cut edge remains in said plane, said embossed cut edge on said projection being adapted to abut against a wall of the recess in the backplate of the brake pad assembly, extending parallel to the embossed cut edge.

10. A dampening sheet, as set forth in claim 9, in which said projection is generally arch-shaped and is partially outlined by two said cuts forming two said cut edges on said projection which extend outside the plane of said dampening sheet.

11. A dampening sheet, as set forth in claim 9, in which said projection is generally dome-shaped and is partially outlined by a single said cut forming a single said cut edge on said projection which extends outside the plane of said dampening sheet.

12. A dampening sheet, as set forth in claims 9, 10 or 11, in which each said cut edge on said projection is rectilinear.

13. A dampening sheet, as set forth in claim 10, in which said two cuts and said two cut edges on said projection are parallel with each other.

14. A dampening sheet, as set forth in claims 9, 10 or 11, comprising at least two embossed projections and wherein said projections and said cut edges on said projections are positioned generally perpendicularly to each other.

\* \* \* \* \*

UNITED STATES PATENT AND TRADEMARK OFFICE
CERTIFICATE OF CORRECTION

PATENT NO. : 5,538,104
DATED : July 23, 1996
INVENTOR(S) : Katz et al.

It is certified that error appears in the above-identified patent and that said Letters Patent is hereby corrected as shown below:

ON THE COVER PAGE:
Item [56]
References Cited, U.S. Patents Documents, "Tellenburg" should be -- Tillenburg --.

Foreign Patent Documents, last line, "9214965" should be -- 9214945 --.

IN THE CLAIMS:

Column 5, line 51, "claims" should be -- claim --.

Column 6, line 4, "claims" should be -- claim --.

Column 6, line 43, "claims" should be -- claim --.

Column 6, line 48, "claims" should be -- claim --.

Signed and Sealed this

Nineteenth Day of November, 1996

Attest:

BRUCE LEHMAN

*Attesting Officer*     *Commissioner of Patents and Trademarks*